(12) United States Patent
Miyamoto

(10) Patent No.: US 12,539,929 B2
(45) Date of Patent: Feb. 3, 2026

(54) MOBILE DEVICE WITH SPHERICAL DRIVE SYSTEM

(71) Applicant: Kyushu Institute of Technology, Kitakyushu (JP)

(72) Inventor: Hiroyuki Miyamoto, Kitakyushu (JP)

(73) Assignee: KYUSHU INSTITUTE OF TECHNOLOGY, Kitakyushu (JP)

( * ) Notice: Subject to any disclaimer, the term of this patent is extended or adjusted under 35 U.S.C. 154(b) by 689 days.

(21) Appl. No.: 17/921,445

(22) PCT Filed: Feb. 17, 2021

(86) PCT No.: PCT/JP2021/005932
§ 371 (c)(1),
(2) Date: Oct. 26, 2022

(87) PCT Pub. No.: WO2021/240912
PCT Pub. Date: Dec. 2, 2021

(65) Prior Publication Data
US 2023/0174176 A1   Jun. 8, 2023

(30) Foreign Application Priority Data

May 26, 2020 (JP) ................................. 2020-091308

(51) Int. Cl.
*B62D 57/00* (2006.01)
*B60K 1/02* (2006.01)

(52) U.S. Cl.
CPC ............... *B62D 57/00* (2013.01); *B60K 1/02* (2013.01)

(58) Field of Classification Search
CPC ................................. B62D 57/00; B60K 1/02

USPC .......................................................... 180/7.1
See application file for complete search history.

(56) References Cited

U.S. PATENT DOCUMENTS

| 2010/0243342 A1 | 9/2010 | Wu et al. |
| 2022/0009571 A1 | 1/2022 | Miyamoto et al. |

FOREIGN PATENT DOCUMENTS

| CN | 112739606 A | 4/2021 |
| DE | 112019005925 T5 | 10/2021 |
| JP | H06090980 A | 4/1994 |
| JP | 2000-126241 A | 5/2000 |

(Continued)

OTHER PUBLICATIONS

International Serch Report dated May 11, 2021, issued in counterpart International Patent Application No. PCT/JP2021/005932.

(Continued)

*Primary Examiner* — Jacob D Knutson
(74) *Attorney, Agent, or Firm* — WHDA, LLP

(57) ABSTRACT

Provided is a mobile device 10 with a spherical drive system that moves over a travel surface G and comprises four or more rotors 15, 15', 16, 16', 17, 17', 18 and 18' that are rotationally driven by driving sources 20, 22, 24 and 26 while in contact with four driving spheres 11, 12, 13 and 14 from two different directions, thereby causing the driving spheres to rotate, wherein the centers P1, P2, P3 and P4 of the driving spheres are positioned at the side edges S1, S2, S3 and S4 of a virtual inverted hip roof pentahedron H having a base e disposed at a position higher than the center of each driving sphere and a ridge O disposed at a position lower than the center of each driving sphere, respectively.

9 Claims, 5 Drawing Sheets

(56) References Cited

FOREIGN PATENT DOCUMENTS

| JP | 2001-354155 A | | 12/2001 | |
|---|---|---|---|---|
| JP | 2001-354156 A | | 12/2001 | |
| JP | 2004024329 A | | 1/2004 | |
| JP | 2008006882 A | | 1/2008 | |
| JP | 2010030360 A | * | 2/2010 | |
| JP | 2010173570 A | * | 8/2010 | |
| JP | 2015-117011 A | | 6/2015 | |
| WO | WO-2020110651 A1 | * | 6/2020 | ............. B62D 61/06 |

OTHER PUBLICATIONS

Office Action dated Oct. 22, 2024, issued in counterpart DE Application No. 112021002961.4. (13 pages).
Office Action dated Jan. 10, 2025, issued in counterpart CN Application No. 202180029487.4. (6 pages).

* cited by examiner

MOBILE DEVICE WITH SPHERICAL DRIVE SYSTEM

TECHNICAL FIELD

The present invention relates to a mobile device with a spherical drive system capable of moving in all directions by rotationally driving spheres.

BACKGROUND ART

Since a moving device (see Patent Document 1) having three or more spheres and three or more driving means (driving motors) that give a rotational force to the spheres can move in all directions, it is effective to use the moving device for an electric wheelchair, a self-propelled carriage, or the like. In the moving device of Patent Document 1, two rotors, which are rotationally driven by using the drive of the driving means, are in contact with one sphere from different directions. In the moving device, the rotor and the sphere are in contact with each other at the same height as the center of the sphere, and an idler (wheel type caster) for pressing the sphere against the rotor is provided. When the rotor runs idle, the moving device does not move in the desired direction. Therefore, it is important to maintain the rotor pressed against the sphere for stable running of the moving device.

CITATION LIST

Patent Literature

Patent Document 1: Japanese Unexamined Patent Application Publication No. 2010-30360

SUMMARY OF INVENTION

Technical Problem

However, in the moving device of Patent Document 1, in rare cases, the rotor may be in a non-contact state with the sphere. When the user operates the moving device, such as when the moving device is used for an electric wheelchair, it is easy for the user to correct the moving direction by himself/herself. But, in a system in which the moving device does not have an operator, such as when the moving device is used for a self-propelled carriage, the moving direction of the moving device cannot be corrected, and there arises a problem that the moving device cannot travel as planned.

As a method of suppressing idling of the rotor, it is conceivable to make the rotor a multi-layer structure made of materials having different elastic forces, but in that case, there arises another problem that the durability of the rotor is lowered and the wear of the rotor becomes remarkable.

The present invention has been made in view of such circumstances, and an object of the present invention is to provide a mobile device with a spherical drive system capable of suppressing idling of a rotor that is rotationally driven by a driving source in a state of being in contact with a sphere.

Solution to Problem

In order to achieve the above object, according to a first aspect of the present invention, there is provided a mobile device with a spherical drive system moving over a travel surface, comprising:

four driving spheres each rolling on the travel surface, and
four or more rotors rotationally driven by driving sources in a state of being in contact with each of the driving spheres from two different directions to rotate the driving spheres,
wherein the travel surface as a horizontal plane,
a center of each of the driving spheres is positioned on each side edge of a virtual inverted hip roof pentahedron having four side faces, a base disposed at a position higher than the center of each of the driving spheres and a ridge located away from the base and disposed at a position lower than the center of each of the driving spheres; and
wherein each of the rotors has a rotation axis perpendicular to one of the side faces, and with the one of side faces as a corresponding side face, each of the rotors is in contact with the driving sphere at a position higher than the center of the contacted driving sphere and also with the driving sphere inside or on the corresponding side face of the virtual inverted hip roof pentahedron.

In order to achieve the above object, according to a second aspect of the present invention, there is provided a mobile device with a spherical drive system moving over a travel surface, comprising:

m (where m=2 or 3) driving spheres and (4-m) driven rotating objects, each rolling on the travel surface, and
three or more rotors rotationally driven by driving sources in a state of being in contact with each of the driving spheres from two different directions to rotate the driving spheres,
wherein the travel surface as a horizontal plane,
each of the driving spheres is positioned on each of different side edges of a virtual inverted hip roof pentahedron having four side faces, a base disposed at a position higher than a center of each of the driving spheres and a ridge located away from the base and disposed at a position lower than the center of each of the driving spheres; and
each of the rotors has a rotation axis perpendicular to one of the side faces, and with the one of side faces as a corresponding side face, each of the rotors is in contact with the driving sphere at a position higher than the center of the contacted driving sphere and also with the driving sphere inside or on the corresponding side face of the virtual inverted hip roof pentahedron.

In order to achieve the above object, according to a third aspect of the present invention, there is provided a mobile device with a spherical drive system moving over a travel surface, comprising:

two or more driving spheres each rolling on the travel surface, and
three or more rotors rotationally driven by driving sources in a state of being in contact with each of the driving spheres from two different directions to rotate the driving spheres,
wherein each of the rotors has a truncated cone shape, and a side surface of each of the rotors comes into contact with the driving sphere at a position higher than a center of the contacted driving sphere.

Advantageous Effects of Invention

In the mobile devices with a spherical drive system according to the first, second, and third inventions, since each of the rotors comes into contact with the driving sphere at a position higher than the center of the driving sphere, the load of the mobile device with a spherical drive system itself and the load of the object mounted on the mobile device with a spherical drive system are applied to the driving spheres via the rotors, each of the rotors can be reliably pressed against the driving sphere, and it is possible to suppress idling of the rotor rotationally driven by the driving source while in contact with the driving sphere.

DESCRIPTION OF EMBODIMENTS

Subsequently, with reference to the accompanying drawings, descriptions will be given on an embodiment of the present invention for a better understanding of the present invention.

Figure 1:
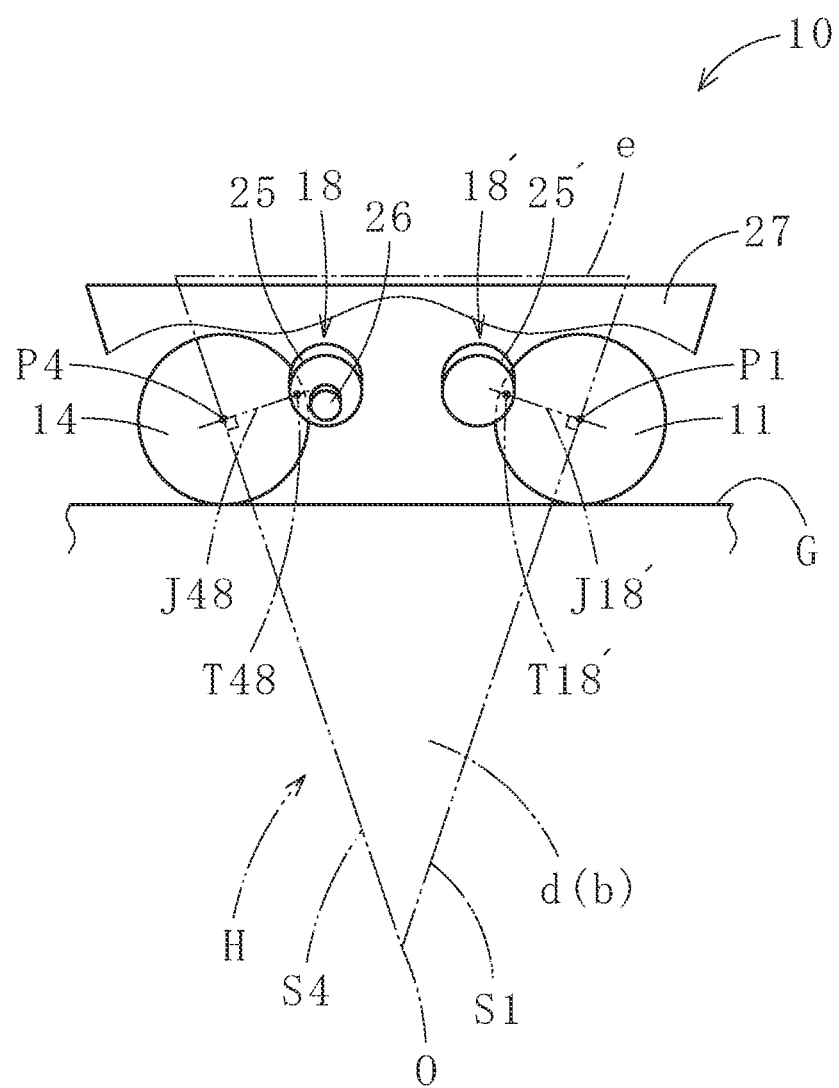
FIG. 1 is a partially omitted front view of a mobile device with a spherical drive system according to an embodiment of the present invention.
Figure 2:
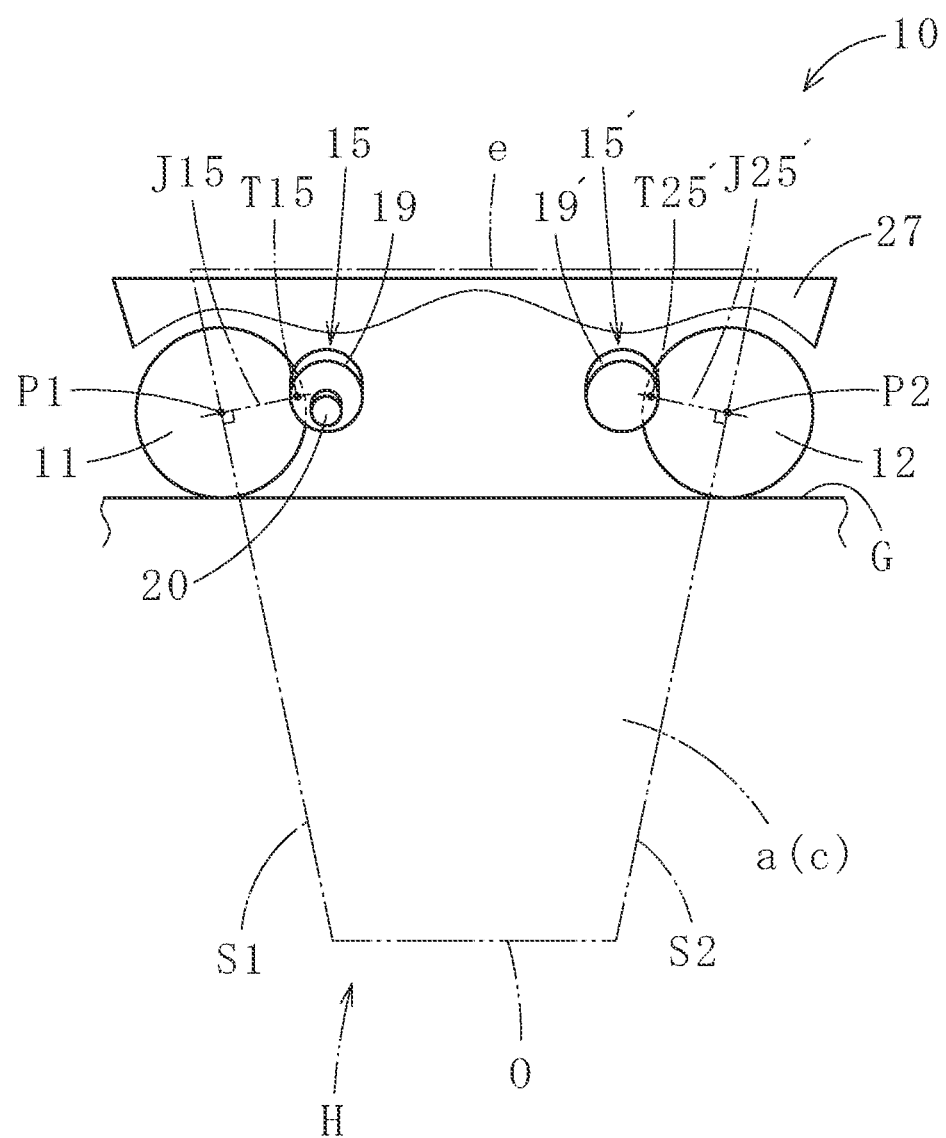
FIG. 2 is a partially omitted side view of the mobile device with a spherical drive system.
Figure 3:
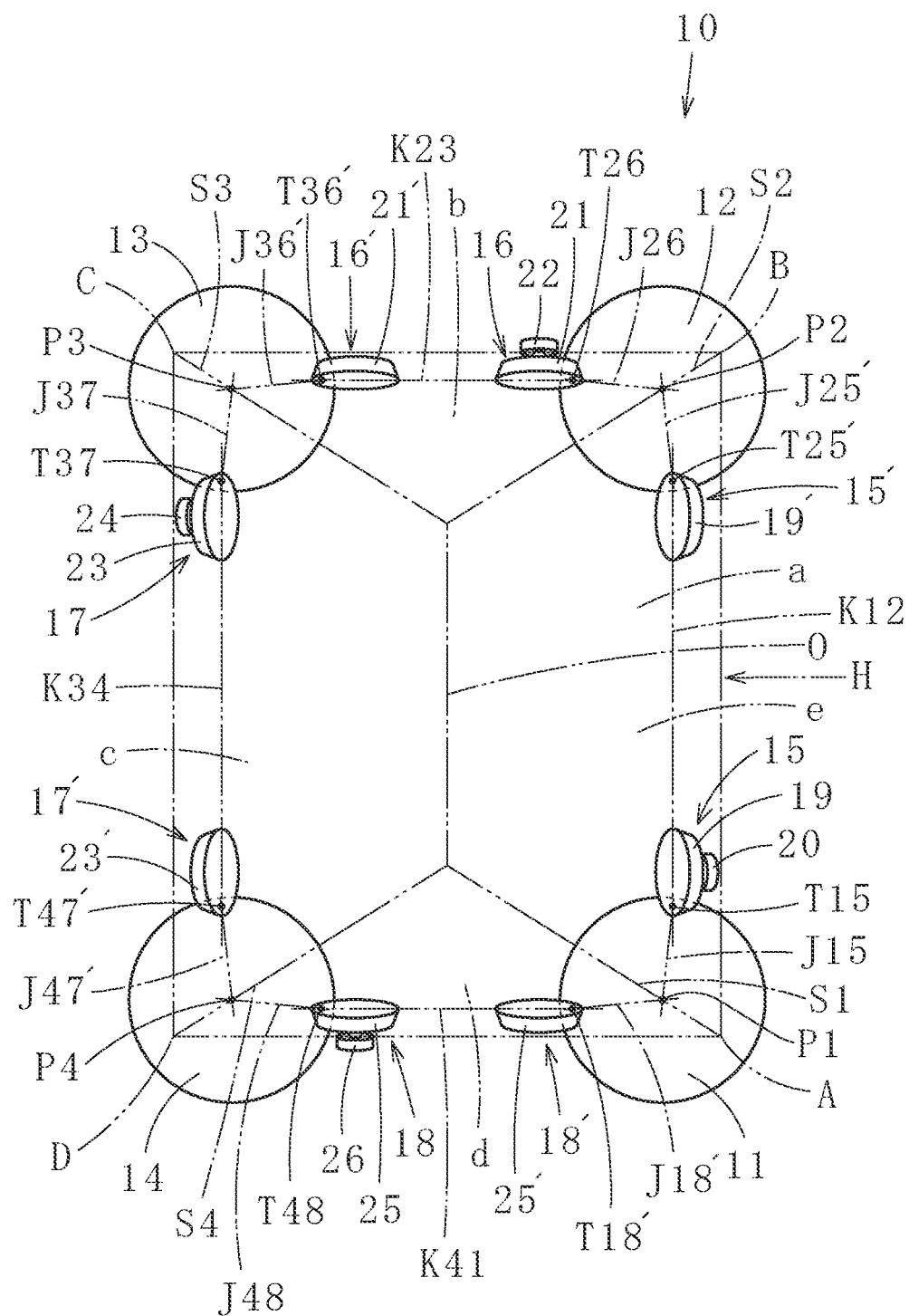
FIG. 3 is a plan view showing an arrangement of the driving spheres and the rotors of the mobile device with a spherical drive system.

As shown in FIGS. 1, 2 and 3, a mobile device 10 with a spherical drive system according to an embodiment of the present invention is a device including four driving spheres 11, 12, 13 and 14 each of which rolls on a travel surface G, and four or more (eight in this embodiment) rotors 15, 15', 16, 16', 17, 17', 18 and 18' rotationally driven by motors 20, 22, 24 and 26, which are examples of driving sources, in a state of being in contact with each of the driving spheres 11, 12, 13 and 14 from two different directions to rotate the driving spheres 11, 12, 13 and 14, and moving over the travel surface G. The details will be described below.

In this embodiment, the driving spheres 11, 12, 13 and 14 are perfect spheres of the same size (equal in diameter) as shown in FIGS. 1, 2 and 3, and are arranged counterclockwise when viewed in a plan view. The center P1 of the driving sphere 11, the center P2 of the driving sphere 12, the center P3 of the driving sphere 13 and the center P4 of the driving sphere 14 are located at the same height in a state where the driving spheres 11, 12, 13 and 14 are placed on the travel surface G as a horizontal plane. Hereinafter, it is assumed that the travel surface G is a horizontal plane and the driving spheres 11, 12, 13 and 14 are placed on the travel surface G. Note that FIG. 3 illustrates a plan view of the driving spheres 11, 12, 13 and 14, the rotors 15, 15', 16, 16', 17, 17', 18 and 18', and the like.

The rotors 15, 15', 16, 16', 17, 17', 18 and 18' are truncated cone-shaped members of the same size and shape, and are arranged at the same height position.

The side surface 19 of the rotor 15 is in contact with the driving sphere 11, and the side surface 19' of the rotor 15' is in contact with the driving sphere 12. The rotors 15 and 15' are connected by a power transmission means (not shown, the same applies hereinafter) having a chain, a pulley, or the like, are rotationally driven by the motor 20 attached to the rotor 15, and rotate in the same direction at the same rotational speed.

The side surface 21 of the rotor 16 is in contact with the driving sphere 12, and the side surface 21' of the rotor 16' is in contact with the driving sphere 13. The rotors 16 and 16' are connected by a power transmission means, are rotationally driven by the motor 22 attached to the rotor 16, and rotate in the same direction at the same rotational speed. The side surface 23 of the rotor 17 is in contact with the driving sphere 13, and the side surface 23' of the rotor 17' is in contact with the driving sphere 14. The rotors 17 and 17' are connected by a power transmission, are rotationally driven by the motor 24 attached to the rotor 17, and rotate in the same direction at the same rotational speed. The side surface 25 of the rotor 18 is in contact with the driving sphere 14, and the side surface 25' of the rotor 18' is in contact with the driving sphere 11. The rotors 18 and 18' are connected by a power transmission, are rotationally driven by the motor 26 attached to the rotor 18, and rotate in the same direction at the same rotational speed.

The rotors 15 and 18' come into contact with the driving sphere 11 from different directions, the rotors 16 and 15' come into contact with the driving sphere 12 from different directions, the rotors 17 and 16' come into contact with the driving sphere 13 from different directions, and the rotors 18 and 17' come into contact with the driving sphere 14 from different directions.

Additionally, the driving spheres 11, 12, 13 and 14 are in contact with ball casters (which may be idlers) for positioning the drive spheres 11, 12, 13 and 14, respectively. The motors 20, 22, 24 and 26 are attached to a base member 27 (see FIGS. 1 and 2) that supports the ball casters.

The contact point where the driving sphere 11 and the side surface 19 of the rotor 15 come into contact with each other and the contact point where the driving sphere 11 and the side surface 25' of the rotor 18' come into contact with each other are referred to as contact points T15 and T18', respectively, the contact point where the driving sphere 12 and the side surface 21 of the rotor 16 come into contact with each other and the contact point where the driving sphere 12 and the side surface 19' of the rotor 15' come into contact with each other are referred to as contact points T26 and T25', respectively, the contact point where the driving sphere 13 and the side surface 23 of the rotor 17 come into contact with each other and the contact point where the driving sphere 13 and the side surface 21' of the rotor 16' come into contact with each other are referred to as contact points T37 and T36', respectively, and the contact point where the driving sphere 14 and the side surface 25 of the rotor 18 come into contact with each other and the contact point where the driving sphere 14 and the side surface 23' of the rotor 17' come into contact with each other are referred to as contact points T48 and T47', respectively. The contact points T15, T18', T26, T25', T37, T36', T48 and T47' are arranged at the same height and at positions higher than the center P1 of the driving sphere 11, the center P2 of the driving sphere 12, the center P3 of the driving sphere 13 and the center P4 of the driving sphere 14.

Therefore, the rotors 15 and 18' contact the driving sphere 11 at a position higher than the center P1 of the driving sphere 11, the rotors 16 and 15' contact the driving sphere 12 at a position higher than the center P2 of the driving sphere 12, the rotors 17 and 16' contact the driving sphere 13 at a position higher than the center P3 of the driving sphere 13, and the rotors 18 and 17' contact the driving sphere 14 at a position higher than the center P4 of the driving sphere 14. Furthermore, the side surface 19 of the rotor 15, the side surface 19' of the rotor 15', the side surface 21 of the rotor 16, the side surface 21' of the rotor 16', the side surface 23 of the rotor 17, the side surface 23' of the rotor 17', the side surface 25 of the rotor 18, and the side surface 25' of the rotor 18' are in contact with the driving spheres 11, 12, 13 and 14 at the same height.

As in the present embodiment, by making the rotor 15 into a truncated cone shape instead of a columnar shape, the degree of freedom in arranging the rotor 15 with respect to the driving sphere 11 can be increased. If the rotor 15 is columnar, it is necessary to arrange the rotation axis of the rotor 15 so as to be orthogonal to a virtual straight line J15 (an example of the virtual straight line J) which passes through the center P1 of the driving sphere 11 and the contact point T15 in order to bring the side surface 19 of the rotor 15 into contact with the driving sphere 11.

On the other hand, in the truncated cone-shaped rotor 15, the rotation axis of the rotor 15 does not have to be orthogonal to the virtual straight line J15 passing through the center P1 of the driving sphere 11 and the contact point T15, and the direction of the rotation axis of the rotor 15 with respect to the virtual straight line J15 can be adjusted by adjusting the angle of the side surface 19 with respect to the upper surface and the bottom surface of the rotor 15. Therefore, the rotation axis of the rotor 15 can be arranged in a desired direction.

The same applies to the rotors 15', 16, 16', 17, 17', 18 and 18'.

Here, as shown in FIGS. 1, 2 and 3, assuming that the hipped roof shaped pentahedron which has four side faces a, b, c and d, a base e of a quadrangle with four right angles (rectangular or square) disposed at a position higher than the center P1 of the driving sphere 11, the center P2 of the driving sphere 12, the center P3 of the driving sphere 13 and the center P4 of the driving sphere 14, and a ridge O located away from the base e and disposed at a position lower than the center P1 of the drive sphere 11, the center P2 of the drive sphere 12, the center P3 of the driving sphere 13 and center P4 of the driving sphere 14 is a virtual inverted hip roof pentahedron H, in this embodiment, the mobile device 10 with a spherical drive system is designed so as to satisfy all of the conditions 1 to 6 described later.

In the virtual inverted hip roof pentahedron H, when the four vertices of the base e are vertices A, B, C and D, respectively, the side face a is a quadrangle (trapezoid in this embodiment) having four vertices at the vertices A and B, and both ends of the ridge O, the side face b is a triangle (an isosceles triangle in this embodiment) having three vertices at the vertices B and C, and one end of the ridge O, the side face c is a quadrangle (trapezoid in this embodiment) having four vertices at the vertices C and D, and both ends of the ridge O, and the side face d is a triangle (an isosceles triangle in this embodiment) having three vertices at the vertices A and D, and the other end of the ridge O. Additionally, the linear side connecting the other end of the ridge O and the vertex A is set as a side edge S1, the linear side connecting the one end of the ridge O and the vertex B is set as a side edge S2, the linear side connecting the one end of the ridge O and the vertex C is set as a side edge S3, and the linear side connecting the other end of the ridge O and the vertex D is set as a side edge S4. In this embodiment, the base e is rectangular, and the side edges S1, S2, S3 and S4 have the same length.

Condition 1: The center P1 of the driving sphere 11, the center P2 of the driving sphere 12, the center P3 of the driving sphere 13, and the center P4 of the driving sphere 14 are located on the side edges S1, S2, S3, and S4, respectively.

Condition 2: The rotors 15 and 18' contact the driving sphere 11 inside the virtual inverted hip roof pentahedron H (the contact points T15 and T18' are located inside the virtual inverted hip roof pentahedron H), the rotors 16 and 15' contact the driving sphere 12 inside the virtual inverted hip roof pentahedron H (the contact points T26 and T25' are located inside the virtual inverted hip roof pentahedron H), the rotors 17 and 16' contact the driving sphere 13 inside the virtual inverted hip roof pentahedron H (the contact points T37 and T36' are located inside the virtual inverted hip roof pentahedron H), and the rotors 18 and 17' contact the driving sphere 14 inside the virtual inverted hip roof pentahedron H (the contact points T48 and T47' are located inside the virtual inverted hip roof pentahedron H).

Condition 3: The rotors 15 and 15' each have a rotation axis that is perpendicular to the side face a (one of the side faces of the virtual inverted hip roof pentahedron H), the rotors 16 and 16' each have a rotation axis that is perpendicular to the side face b (one of the side faces of the virtual inverted hip roof pentahedron H), the rotors 17 and 17' each have a rotation axis that is perpendicular to the side face c (one of the side faces of the virtual inverted hip roof pentahedron H), and the rotors 18 and 18' each have a rotation axis that is perpendicular to the side face d (one of the side faces of the virtual inverted hip roof pentahedron H). In this embodiment, the side face a to which the rotation axes of the rotors 15 and 15' are perpendicular is a corresponding side face to the rotors 15 and 15', the side face b to which the rotation axes of the rotors 16 and 16' are perpendicular is a corresponding side face to the rotors 16 and 16', the side face c to which the rotation axes of the rotors 17 and 17' are perpendicular is a corresponding side face to the rotors 17 and 17', and the side face d to which the rotation axes of the rotors 18 and 18' are perpendicular is a corresponding side face to the rotors 18 and 18'.

From the condition 3, in this embodiment, it can be said that the rotation axes of the rotors 15 and 18' that are in contact with the driving sphere 11 are non-parallel, the rotation axes of the rotors 16 and 15' that are in contact with the driving sphere 12 are non-parallel, the rotation axes of the rotors 17 and 16' that are in contact with the driving sphere 13 are non-parallel, and the rotation axes of the rotors 18 and 17' that are in contact with the driving sphere 14 are non-parallel.

In this embodiment, by arranging the driving spheres 11, 12, 13 and 14 and the rotors 15, 15', 16, 16', 17, 17', 18 and 18' so as to satisfy the conditions 1, 2 and 3, and adjusting the rotation speeds of the motors 20, 22, 24 and 26, the mobile device 10 with a spherical drive system can be moved in any direction on the travel surface G while suppressing the sideslip of the driving sphere 11 with respect to the rotors 15 and 18', the sideslip of the driving sphere 12 with respect to the rotors 16 and 15', the sideslip of the driving sphere 13 with respect to the rotors 17 and 16', and the sideslip of the driving sphere 14 with respect to the rotors 18 and 17'. For example, the sideslip of the drive sphere 11 with respect to the rotor 15 in a state where the rotor 18' is rotating and applying a rotational force to the driving sphere 11 means that the relative movement of the driving sphere 11 with respect to the rotor 15 at the contact point T15 is a motion other than a turning motion centered on the contact point T15. Therefore, when the driving sphere 11 skids with respect to the rotor 15, the wear of the rotor 15 and the driving sphere 11 is promoted.

Moreover, since the rotors 15 and 18' are in contact with the driving sphere 11 at a position higher than the center P1 of the driving sphere 11, the force of the vertical component acts on the driving sphere 11 through the rotors 15 and 18'. In this respect, the same applies to the rotors 16 and 15' with respect to the driving sphere 12, the rotors 17 and 16' with respect to the driving sphere 13, and the rotors 18 and 17' with respect to the driving sphere 14. Therefore, by utilizing the weight of the base member 27, the heavy object mounted on the base member 27 and the like, the rotors 15 and 18' can be pressed against the driving sphere 11, the rotors 16 and 15' can be pressed against the driving sphere 12, the rotor 17 and 16' can be pressed against the driving sphere 13, and the rotors 18 and 17' can be pressed against the driving sphere 14. As a result, idling of the rotors 15, 15', 16, 16', 17, 17', 18 and 18' can be suppressed.

As long as the contact points T15 and T25' are located at positions slightly higher than the center P1 of the driving sphere 11 and the center P2 of the driving sphere 12, respectively, even if the rotors 15 and 15' are in contact with the driving spheres 11 and 12 on the side face a (corresponding side face) of the virtual inverted hip roof pentahedron H, respectively, the driving spheres 11 and 12 do not substantially skid with respect to the rotors 15 and 15', respectively. The same applies to the relationship between the rotors 16 and 16' and the driving spheres 12 and 13, the relationship between the rotors 17 and 17' and the driving spheres 13 and 14, and the relationship between the rotors 18 and 18' and the driving spheres 14 and 11.

Therefore, the mobile device 10 with a spherical drive system can also be designed so as to satisfy the following condition 2' instead of the condition 2.

Condition 2': The rotors 15 and 15' contact the driving spheres 11 and 12 on the side face a of the virtual inverted hip roof pentahedron H (side face corresponding to the rotors 15 and 15'), respectively, the rotors 16 and 16' contact the driving spheres 12 and 13 on the side face b of the virtual inverted hip roof pentahedron H (side surface corresponding to the rotors 16 and 16'), respectively, the rotors 17 and 17' contact the driving spheres 13 and 14 on the side face c of the virtual inverted hip roof pentahedron H (side face corresponding to the rotors 17 and 17'), respectively, and the rotors 18 and 18' contact the driving spheres 14 and 11 on the side face d of the virtual inverted hip roof pentahedron H (side face corresponding to the rotors 18 and 18'), respectively.

Here, from the viewpoint of stably suppressing the occurrence of idling of each rotor with respect to the contacted driving sphere, such as idling of the rotors 15 and 18' with respect to the driving sphere 11, as a result of the verification, it has been confirmed that it is preferable to satisfy one of the following conditions 4, 5 and 6 (more preferably two, and even more preferably all three) in addition to the conditions 1, 2 and 3. It should be noted that satisfying the conditions 1, 2 and 3 is more important than satisfying the conditions 4, 5 and 6 for suppressing idling of the rotor with respect to the driving sphere.

Condition 4: The virtual straight line J15 passing through the contact point T15 where the driving sphere 11 and the rotor 15 meet and the center P1 of the driving sphere 11, and a virtual straight line J18' (an example of the virtual straight line J) passing through the contact point T18' where the driving sphere 11 and the rotor 18' meet and the center P1 of the driving sphere 11 are orthogonal to the side edge S1 where the center P1 of the driving sphere 11 is located, as shown in FIGS. 1 and 2. A virtual straight line J26 (an example of the virtual straight line J) passing through the contact point T26 where the driving sphere 12 and the rotor 16 meet and the center P2 of the driving sphere 12, and a virtual straight line J25' (an example of the virtual straight line J) passing through the contact point T25' where the driving sphere 12 and the rotor 15' meet and the center P2 of the driving sphere 12 are orthogonal to the side edge S2 where the center P2 of the driving sphere 12 is located. A virtual straight line J37 (an example of the virtual straight line J) passing through the contact point T37 where the driving sphere 13 and the rotor 17 meet and the center P3 of the driving sphere 13, and a virtual straight line J36' (an example of the virtual straight line J) passing through the contact point T36' where the driving sphere 13 and the rotor 16' meet and the center P3 of the driving sphere 13 are orthogonal to the side edge S3 where the center P3 of the driving sphere 13 is located. A virtual straight line J48 (an example of the virtual straight line J) passing through the contact point T48 where the driving sphere 14 and the rotor 18 meet and the center P4 of the driving sphere 14, and a virtual straight line J47' (an example of the virtual straight line J) passing through the contact point T47' where the driving sphere 14 and the rotor 17' meet and the center P4 of the driving sphere 14 are orthogonal to the side edge S4 where the center P4 of the driving sphere 14 is located.

Condition 5: The virtual straight line J15 passing through the contact point T15 where the driving sphere 11 and the rotor 15 meet and the center P1 of the driving sphere 11 intersects the side surface 19 of the rotor 15 perpendicularly, and the virtual straight line J18' passing through the contact point T18' where the driving sphere 11 and the rotor 18' meet and the center P1 of the driving sphere 11 intersects the side surface 25' of the rotor 18' perpendicularly. The virtual straight line J26 passing through the contact point T26 where the driving sphere 12 and the rotor 16 meet and the center P2 of the driving sphere 12 intersects the side surface 21 of the rotor 16 perpendicularly, and the virtual straight line J25' passing through the contact point T25' where the driving sphere 12 and the rotor 15' meet and the center P2 of the driving sphere 12 intersects the side surface 19' of the rotor 15' perpendicularly. The virtual straight line J37 passing through the contact point T37 where the driving sphere 13 and the rotor 17 meet and the center P3 of the driving sphere 13 intersects the side surface 23 of the rotor 17 perpendicularly, and the virtual straight line J36' passing through the contact point T36' where the driving sphere 13 and the rotor 16' meet and the center P3 of the driving sphere 13 intersects the side surface 21' of the rotor 16' perpendicularly. The virtual straight line J48 passing through the contact point T48 where the driving sphere 14 and the rotor 18 meet and the center P4 of the driving sphere 14 intersects the side surface 25 of the rotor 18 perpendicularly, and the virtual straight line J47' passing through the contact point T47' where the driving sphere 14 and the rotor 17' meet and the center P4 of the driving sphere 14 intersects the side surface 23' of the rotor 17' perpendicularly.

Condition 6: The side face a of the virtual inverted hip roof pentahedron H is parallel to a virtual straight line K12 (an example of the virtual straight line K) passing through the contact point T15 where the rotors 15 and 15' (here, the rotor 15) located between two of the driving spheres 11 and 12 and the sphere 11, one of the two driving spheres 11 and 12 meet, and the contact point T25' where the rotors 15 and 15' (here, the rotor 15') and the sphere 12, the other of the two driving spheres 11 and 12 meet. Furthermore, the centers P1 and P2 of the two driving spheres 11 and 12 are located on the two side edges S1 and S2 forming a part of an outer edge of the side face a, respectively. The side face b is parallel to a virtual straight line K23 (an example of the virtual straight line K) passing through the contact point T26 where the rotors 16 and 16' (here, the rotor 16) located between two of the driving spheres 12 and 13 and the sphere 12, one of the two driving spheres 12 and 13 meet, and the contact point T36' where the rotors 16 and 16' (here, the rotor 16') and the sphere 13, the other of the two driving spheres 12 and 13 meet. Furthermore, the centers P2 and P3 of the two driving spheres 12 and 13 are located on the two side edges S2 and S3 forming a part of an outer edge of the side face b, respectively. The side face c is parallel to a virtual straight line K34 (an example of the virtual straight line K) passing through the contact point T37 where the rotors 17 and 17' (here, the rotor 17) located between two of the driving spheres 13 and 14 and the sphere 13, one of the two driving spheres 13 and 14 meet, and the contact point T47' where the rotors 17 and 17' (here, the rotor 17') and the sphere 14, the other of the two driving spheres 13 and 14 meet. Furthermore, the centers P3 and P4 of the two driving spheres 13 and 14 are located on the two side edges S3 and S4 forming a part of an outer edge of the side face c, respectively. The side face d is parallel to a virtual straight line K41 (an example of the virtual straight line K) passing through the contact point T48 where the rotors 18 and 18' (here, the rotor 18) located between two of the driving spheres 14 and 11 and the sphere 14, one of the two driving spheres 14 and 11 meet, and the contact point T18' where the rotors 18 and 18' (here, the rotor 18') and the sphere 11, the other of the two driving spheres 14 and 11 meet. Furthermore, the centers P4 and P1 of the two driving spheres 14 and 11 are located on the two side edges S4 and S1 forming a part of an outer edge of the side face d, respectively.

Next, it will be described that the moving speed during translational movement and the rotational angular velocity during turning movement of the mobile device 10 with a spherical drive system can be freely controlled by adjusting the rotation speeds of the motors 20, 22, 24 and 26.

Figure 4:
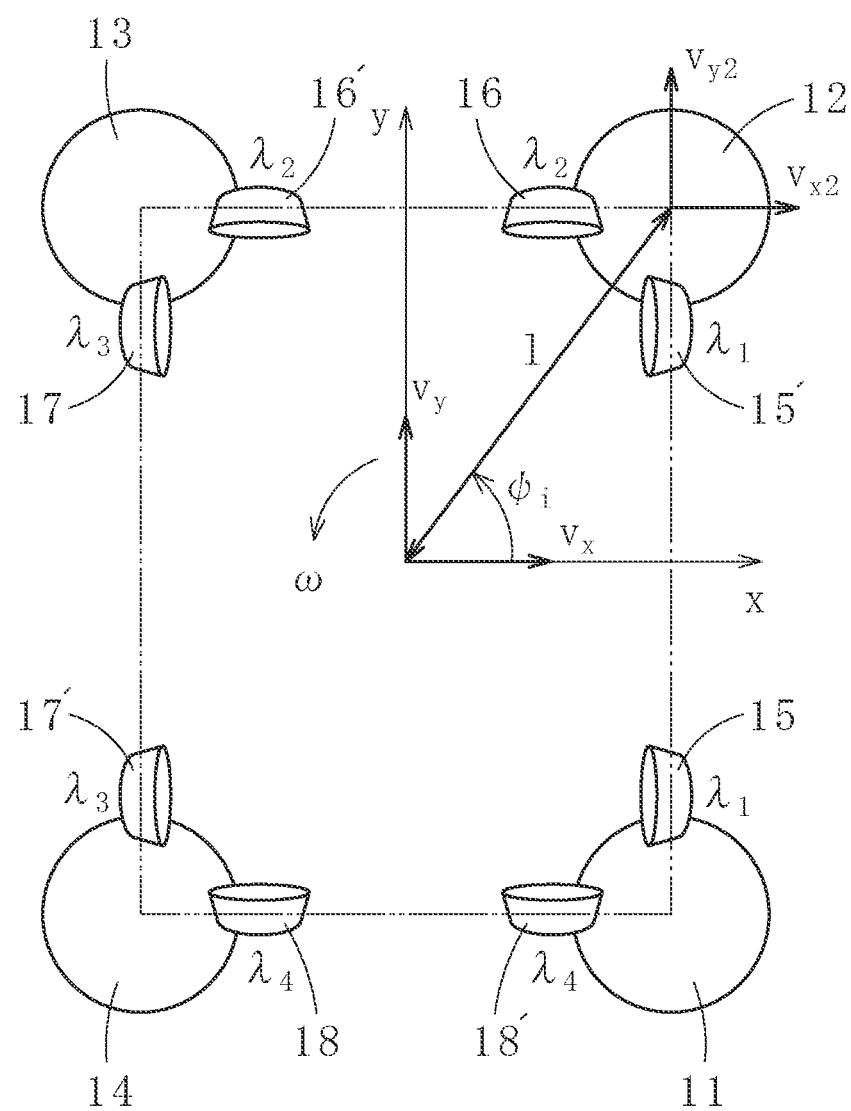
FIG. 4 is an explanatory diagram showing a coordinate system of the mobile device with a spherical drive system.

Here, each value of the mobile device 10 with a spherical drive system is defined as follows. That is, as shown in FIG. 4, the distance from the center of a rectangle (hereinafter, referred to as "mechanism center"), which has four vertices consisting of the center P1 of the driving sphere 11, the center P2 of the driving sphere 12, the center P3 of the driving sphere 13 and the center P4 of the driving sphere 14, to each of the center P1 of the driving sphere 11, the center P2 of the driving sphere 12, the center P3 of the driving sphere 13 and the center P4 of the driving sphere 14 is set as l. In addition, the angle formed by the x-axis and the line segment connecting the mechanism center and the center P1 of the driving sphere 11, the angle formed by the x-axis and the line segment connecting the mechanism center and the center P2 of the driving sphere 12, the angle formed by the x-axis and the line segment connecting the mechanism center and the center P3 of the driving sphere 13 and the angle formed by the x-axis and the line segment connecting the mechanism center and the center P4 of the driving sphere 14 are set as $\psi_1$, $\psi_2$, $\psi_3$ and $\psi_4$, respectively.

The angular velocity of each of the rotors 15 and 15' is set as $\lambda_1$, the angular velocity of each of the rotors 16 and 16' is set as $\lambda_2$, the angular velocity of each of the rotors 17 and 17' is set as $\lambda_3$, and the angular velocity of each of the rotors 18 and 18' is set as $\lambda_4$. The x-axis direction component and the y-axis direction component of the translational moving velocity at the mechanism center are set as $v_x$ and $v_y$, respectively. In a plan view, the counterclockwise rotation direction of the mobile device 10 with a spherical drive system is the positive direction, and the rotation speed at the mechanism center is set as @. Moreover, the inclination angle of each of the side faces a, b, c and d of the virtual inverted hip roof pentahedron H with respect to the travel surface G is set as a.

Here, the angular velocity of the driving sphere 14 in the state where the rotor 17' is stopped and the rotor 18 is rotated is obtained, and based on the result, the angular velocity of the driving sphere 14 and the angular velocities of the other driving spheres 11, 12 and 13 in the state where the rotor 18 is stopped and the rotor 17' is rotated are derived.

Figure 5:
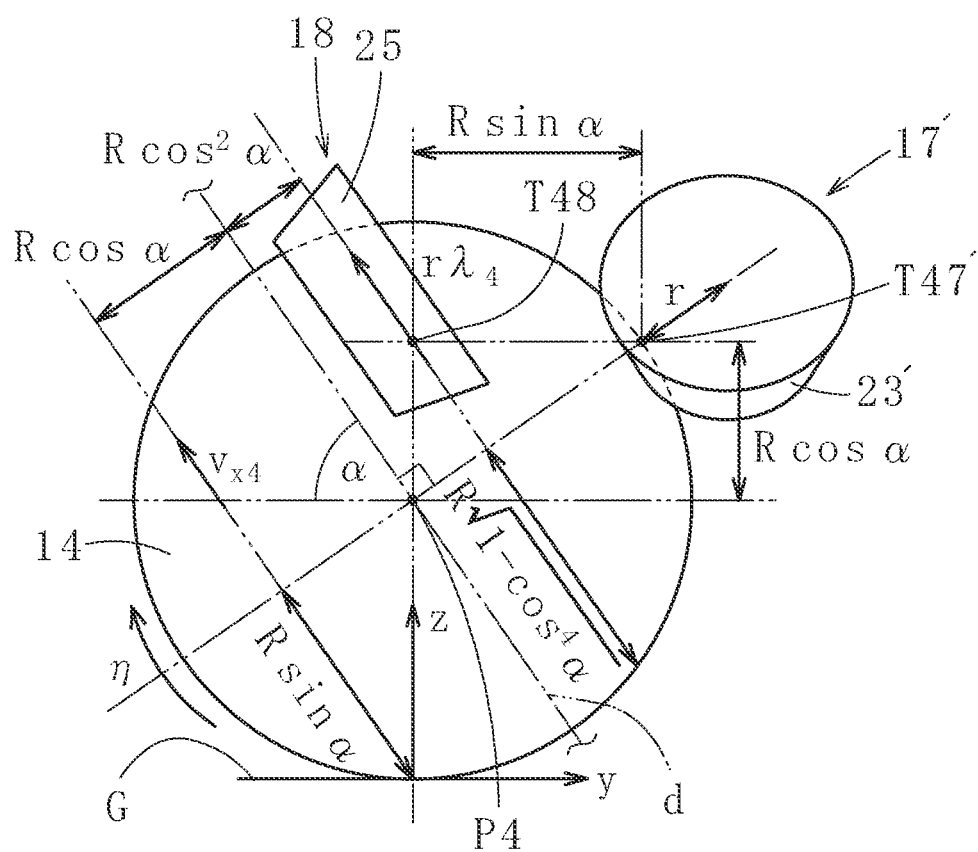
FIG. 5 is an explanatory diagram illustrating the derivation of the angular velocity of the driving sphere of the mobile device with a spherical drive system.

The radius of the driving sphere 14 is set as R, and as shown in FIG. 5, the radius of the portion of the truncated cone-shaped rotor 18 in contact with the driving sphere 14 (the portion corresponding to the contact point T48) is set as r. It is assumed that the contact point T48 is arranged at the position of $R\cos^2\alpha$ inward from the side face d of the virtual inverted hip roof pentahedron H and at the position of $R\cos\alpha$ upward from the center P4 of the driving sphere 14.

When the rotor 18 rotates while the rotor 17' is stopped, the driving sphere 14 rotates around a straight line (that is, the virtual straight line J47') passing through the contact point T47' where the driving sphere 14 and the rotor 17' meet and the center P4 of the driving sphere 14 as a rotation axis (this rotation axis is parallel to the rotation axis of the rotor 18). Since the rotational angular velocity of the driving sphere 14 at this time is η and the peripheral velocity of the driving sphere 14 at the contact point T48 where the driving sphere 14 and the rotor 18 meet is $r\lambda_4$, the following equation (1) is established by $r\lambda_4 = \eta R\sqrt{1-\cos^4\alpha}$.

[Math. 1]
$$\eta = \frac{r\lambda_4}{R\sqrt{1-\cos^4\alpha}} \quad (1)$$

As shown in FIG. 5, the radius of gyration of the driving sphere 14 at the contact point where the travel surface G and the driving sphere 14 meet is $R\sin\alpha$. Therefore, the peripheral speed of the driving sphere 14 at the contact point where the travel surface G and the driving sphere 14 meet, that is, the moving speed $v_{x4}$ of the driving sphere 14 in the x direction is expressed by the following equation (2).

[Math. 2]
$$v_{x4} = \eta R \sin\alpha = \frac{r\lambda_4}{R\sqrt{1-\cos^4\alpha}} R\sin\alpha \quad (2)$$
$$= \frac{r\lambda_4}{\sqrt{1+\cos^2\alpha}}$$

Similarly, the moving speed $v_{y4}$ of the driving sphere 14 in the y direction is expressed by the following equation (3).

[Math. 3]
$$v_{y4} = -\frac{r\lambda_3}{\sqrt{1+\cos^2\alpha}} \quad (3)$$

Therefore, the moving speeds of the driving spheres 11, 12, 13 and 14 in the x-direction and the y-direction are expressed by the following equations (4) with $k = r/\sqrt{1+\cos^2\alpha}$.

[Math. 4]

$v_{x1} = k\lambda_1 = v_x - l\omega \sin\psi_1$, $v_{y1} = k\lambda_1 = v_y + l\omega \cos\psi_1$, $v_{y2} = k\lambda_1 = v_y + l\omega \cos \psi_2,$ $v_{x2} = -k\lambda_2 = v_x - l\omega \sin \psi_2,$ $v_{x3} = -k\lambda_2 = v_x - l\omega \sin \psi_3,$ $v_{y3} = -k\lambda_3 = v_y - l\omega \cos \psi_3,$ $v_{y1} = -k\lambda_3 = v_y - l\omega \cos \psi_4,$ $v_{x4} = k\lambda_4 = v_x - l\omega \sin \psi_4,$  (4)

Additionally, since $\sin \psi_2 = \sin \psi_3 = -\sin \psi_1 = -\sin \psi_4$ and $\cos \psi_2 = \cos \psi_1 = -\cos \psi_3 = -\cos \psi_4$, if $\psi = \psi_2$, then the following equations (5) are obtained and the following equation (6) is further obtained.

[Math. 5]

$k\lambda_1 = v_y + l\omega \cos \psi,$ $k\lambda_2 = -v_x + l\omega \sin \psi,$ $k\lambda_3 = -v_y + l\omega \cos \psi,$ $k\lambda_4 = v_x + l\omega \sin \psi,$  (5)

[Math. 6]

$$\begin{pmatrix} \lambda_1 \\ \lambda_2 \\ \lambda_3 \\ \lambda_4 \end{pmatrix} = \frac{\sqrt{1 + \cos^2 \alpha}}{r} \begin{pmatrix} 0 & 1 & l\cos\psi \\ -1 & 0 & l\sin\psi \\ 0 & -1 & l\cos\psi \\ 1 & 0 & l\sin\psi \end{pmatrix} \begin{pmatrix} v_x \\ v_y \\ \omega \end{pmatrix}$$  (6)

It can be seen from the equation (6) that the moving speed during translational movement and the rotational angular velocity during turning movement of the mobile device 10 with a spherical drive system can be freely controlled by adjusting the rotation speeds of the motors 20, 22, 24 and 26.

Moreover, as in the present embodiment, by determining the arrangement of each of the driving spheres, each of the rotors and the like based on the virtual inverted hip roof pentahedron, there is an advantage that it is not necessary to change the size and shape of each rotor as long as the inclination angle of each side face of the virtual inverted hip roof pentahedron is fixed, even if the ratio of the length of the short side to the length of the long side of the rectangle having four vertices consisting of the centers of the driving spheres changes.

In this regard, when the arrangement of each of the driving spheres, each of the rotors and the like is determined based on a virtual inverted quadrangular pyramid formed with a quadrangular pyramid turned upside down instead of the virtual inverted hip roof pentahedron, it is necessary to change the shape of each rotor according to the ratio of the length of the short side to the length of the long side of the rectangle having four vertices consisting of the centers of the driving spheres.

In the mobile device 10 with a spherical drive system described so far, two rotors are provided between adjacent driving spheres (for example, rotors 15 and 15' are provided between the driving spheres 11 and 12), and a total of eight rotors are provided. The number of rotors provided between adjacent driving spheres may be one, and this rotor may come into contact with both of the adjacent driving spheres. In this case, the total number of rotors are four. Therefore, in a mobile device with a spherical drive system in which rotors are brought into contact with each of four driving spheres from two different directions, the minimum total number of the rotors is four.

Additionally, although the mobile device 10 with a spherical drive system includes four driving spheres, the mobile device with a spherical drive system can translate in all directions and turn clockwise and counterclockwise when it has two or three driving spheres. A mobile device with a spherical drive system having two or three driving spheres and capable of suppressing idling of rotors is as follows. That is, it is a mobile device with a spherical drive system moving over a travel surface, comprising: m (where m=2 or 3) driving spheres and (4-m) driven rotating objects, each of which rolls on the travel surface, and three or more rotors rotationally driven by driving sources in a state of being in contact with each of the driving spheres from two different directions to rotate the driving spheres, wherein with the travel surface as a horizontal plane, each of the driving spheres is positioned on each of different side edges of a virtual inverted hip roof pentahedron having four side faces, a base disposed at a position higher than a center of each of the driving spheres and a ridge located away from the base and disposed at a position lower than the center of each of the driving spheres; and each of the rotors has a rotation axis perpendicular to one of the side faces, and with the one of side faces as a corresponding side face, each of the rotors is in contact with the driving sphere at a position higher than the center of the contacted driving sphere and also with the driving sphere inside or on the corresponding side face of the virtual inverted hip roof pentahedron.

Furthermore, from the viewpoint of pressing the rotors against the driving spheres by the load of the base member or the like to suppress idling of the rotors, the rotors and their rotation axes do not have to be arranged as described above with respect to the virtual inverted hip roof pentahedron. The rotor may be in contact with the driving sphere at a position higher than the center of the contacted driving sphere. In this case, in order to increase the degree of freedom in arranging each rotor, it is preferable to make the rotor whose side surface contacts the driving sphere into a truncated cone shape.

Therefore, the mobile device with a spherical drive system that suppresses idling of rotors and further increases the degree of freedom in arranging the rotors is a device comprising two or more driving spheres and three or more rotors rotationally driven by driving sources in a state of being in contact with each of the driving spheres from two different directions to rotate the driving spheres, and moving over a travel surface, wherein each of the rotors has a truncated cone shape, and a side surface of each of the rotors comes into contact with the driving sphere at a position higher than a center of the contacted driving sphere.

Moreover, in order to put a heavy object on the mobile device with a spherical drive system, it is preferable to use four driving spheres rather than three.

In addition, in the mobile device with a spherical drive system, in order to make the entire device compact, it is preferable that each rotor is brought into contact with only one driving sphere. This is because it is necessary to use a rotor having a large diameter in order to bring one rotor into contact with the two driving spheres. Therefore, when four driving spheres are provided, the number of rotors is eight.

When each rotor is brought into contact with only one driving sphere, a design in which one motor (driving source) rotationally drives one rotor (the number of motors and the number of rotors are the same) is preferable from the viewpoint of making the entire device compact. This is because it is necessary to use a motor having a large volume when one motor rotationally drives two rotors, Therefore, when eight rotors are provided, it is preferable that eight motors rotationally drive different rotors.

Although the embodiment of the present invention has been described above, the present invention is not limited to the above-described embodiment, and all changes in conditions that do not deviate from the gist are within the scope of the present invention.

For example, the rotor does not have to be truncated cone-shaped, and may be, for example, columnar or spherical.

Furthermore, the rotation axis of the rotor may be a shaft member (that is, an existing member) or a virtual shaft.

The driving spheres may be different in size, and the rotors may be different in size and shape. Additionally, with the driving spheres placed on a horizontal plane, the rotors may be arranged so that the rotors contact the driving spheres at different heights.

Moreover, the present invention is also applicable to a mobile device with a spherical drive system in which the direction of moving on a travel surface is specified (for example, a mobile device with a spherical drive system that can only move forward and backward).

INDUSTRIAL APPLICABILITY

Since the mobile device with a spherical drive system according to the present invention can stably perform a predetermined movement by suppressing idling of the rotor in contact with the sphere, the mobile device can be used as a self-propelled device for carrying objects.

REFERENCE SIGNS LIST

10: mobile device with spherical drive system, 11, 12, 13, 14: driving sphere, 15, 15', 16, 16', 17, 17', 18, 18': rotor, 19, 19': side surface, 20: motor, 21, 21': side surface, 22: motor, 23, 23': side surface, 24: motor, 25, 25': side surface, 26: motor, 27: base member, A, B, C, D: vertex, a, b, c, d: side face, G: travel surface, H: virtual inverted hip roof pentahedron, J15, J18', J25', J26, J36', J37, J47', J48: virtual straight line J, K12, K23, K34, K41: virtual straight line K, O: ridge, P1, P2, P3, P4: center, S1, S2, S3, S4: side edge, T15, T18', T25', T26, T36', T37, T47', T48: contact point, e: base

The invention claimed is:

1. A mobile device with a spherical drive system moving over a travel surface, comprising:
    four driving spheres each rolling on the travel surface, and
    four or more rotors rotationally driven by driving sources in a state of being in contact with each of the driving spheres from two different directions to rotate the driving spheres,
    wherein with the travel surface as a horizontal plane,
    a center of each of the driving spheres is positioned on each side edge of a virtual inverted hip roof pentahedron having four side faces, a base disposed at a position higher than the center of each of the driving spheres, and a ridge located away from the base and disposed at a position lower than the center of each of the driving spheres; and
    each of the rotors has a rotation axis perpendicular to one of the side faces, and with the one of side faces as a corresponding side face, each of the rotors is in contact with the driving sphere at a position higher than the center of the contacted driving sphere and also with the driving sphere inside or on the corresponding side face of the virtual inverted hip roof pentahedron.

2. The mobile device with a spherical drive system according to claim 1, wherein virtual straight lines J each passing through a contact point where the driving sphere and the rotor meet and the center of the driving sphere are each orthogonal to the side edge on which the center of the driving sphere is located.

3. The mobile device with a spherical drive system according to claim 1, wherein each of the rotors has a truncated cone shape and a side surface in contact with the driving sphere, and virtual straight lines J each passing through a contact point where the driving sphere and the side surface of the rotor meet and the center of the driving sphere each intersect the side surface of the rotor perpendicularly.

4. The mobile device with a spherical drive system according to claim 1, wherein the side faces of the virtual inverted hip roof pentahedron are respectively parallel to virtual straight lines K each passing through a contact point where the rotor or one of the rotors located between two of the driving spheres and one of the two driving spheres meet, and a contact point where the rotor or another one of the rotors located between the two driving spheres and the other of the two driving spheres meet, each of the two driving spheres centered on each of two of the side edges forming a part of an outer edge of each of the side faces.

5. The mobile device with a spherical drive system according to claim 1, wherein the driving spheres are of a same size, and the rotors have a truncated cone shape of a same size and a side surface in contact with the driving sphere at a same height.

6. A mobile device with a spherical drive system moving over a travel surface, comprising:
    m (where m=2 or 3) driving spheres and (4-m) driven rotating objects, each rolling on the travel surface, and
    three or more rotors rotationally driven by driving sources in a state of being in contact with each of the driving spheres from two different directions to rotate the driving spheres,
    wherein with the travel surface as a horizontal plane,
    each of the driving spheres is positioned on each of different side edges of a virtual inverted hip roof pentahedron having four side faces, a base disposed at a position higher than a center of each of the driving spheres, and a ridge located away from the base and disposed at a position lower than the center of each of the driving spheres; and
    each of the rotors has a rotation axis perpendicular to one of the side faces, and with the one of side faces as a corresponding side face, each of the rotors is in contact with the driving sphere at a position higher than the center of the contacted driving sphere and also with the driving sphere inside or on the corresponding side face of the virtual inverted hip roof pentahedron.

7. A mobile device with a spherical drive system moving over a travel surface, comprising:
    two or more driving spheres each rolling on the travel surface, and
    three or more rotors rotationally driven by driving sources in a state of being in contact with each of the driving spheres from two different directions to rotate the driving spheres,
    wherein each of the rotors has a truncated cone shape, and a side surface of each of the rotors comes into contact with the driving sphere at a position higher than a center of the contacted driving sphere.

8. The mobile device with a spherical drive system according to claim 7, wherein the number of the driving spheres and the number of the rotors are four and eight, respectively, and two of the rotors are in contact with each of the respective driving spheres.

9. The mobile device with a spherical drive system according to claim 8, wherein the number of the driving sources is eight and the driving sources rotationally drive the different rotors.

* * * * *